Figure 1:
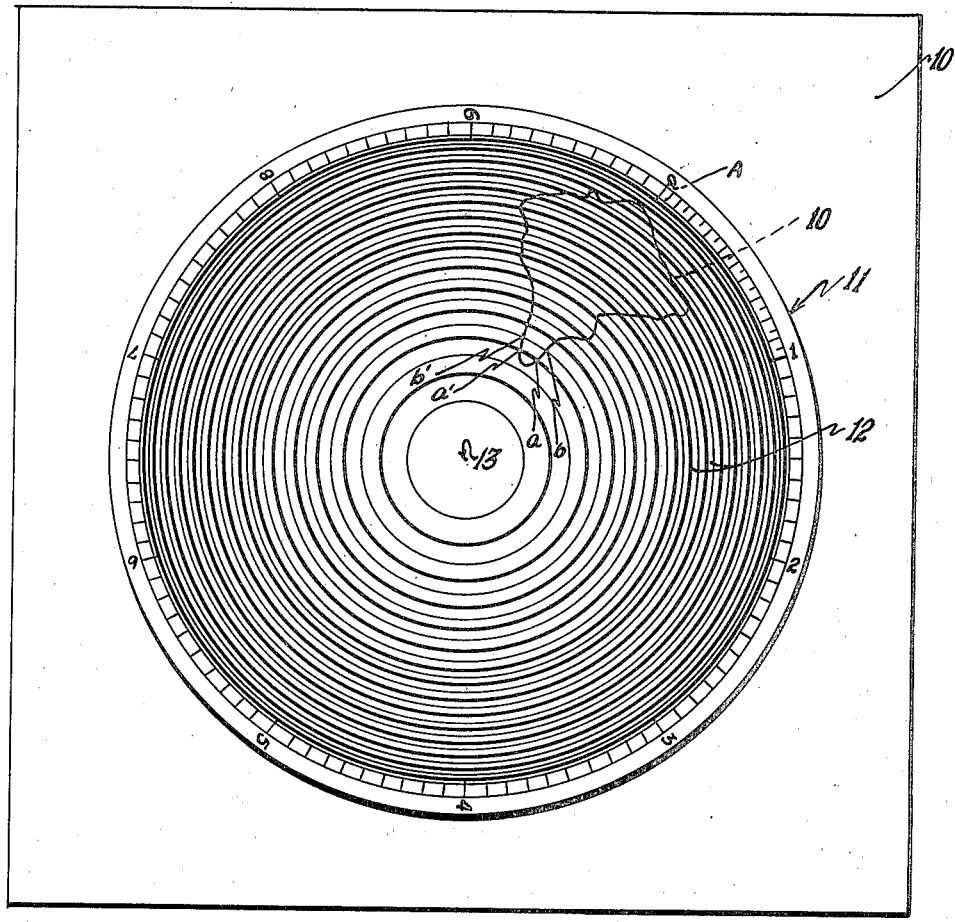

Oct. 5, 1937.    H. G. SMITH    2,094,758

METHOD OF MAKING MEASURING DEVICES

Original Filed Sept. 5, 1934

INVENTOR
Hale G. Smith
BY Frederic P. Warfield
ATTORNEY

Patented Oct. 5, 1937

2,094,758

UNITED STATES PATENT OFFICE 2,094,758

METHOD OF MAKING MEASURING DEVICES

Hale G. Smith, Jackson Heights, N. Y., assignor to Aerial Explorations, Inc., New York, N. Y., a corporation of New Jersey Original application September 5, 1934, Serial No. 742,711. Divided and this application October 7, 1935, Serial No. 43,842. Renewed March 26, 1937

5 Claims. (Cl. 33—122)

In the measurements of areas of plane figures, it is customary to utilize measuring instruments called "planimeters" for the purpose of determining the area of such figures. The usual type of planimeter falls into one of two general classes, i. e., either a "polar" planimeter or a "rolling" planimeter.

In the polar planimeter there are two principal parts, namely, the tracer arm carrying the tracing point and a carriage with the computing wheel and the pole arm, which is a rod mounted on a pivot on which the instrument revolves. The area of any figure is obtained accurately by tracing its boundary line with the tracing point, reading off the graduations on the measuring wheel and multiplying by a suitable factor to give square feet, square miles, or other desired unit. Since the scope of this type of instrument is limited by the length of its arms, a large figure has to be divided into sections.

In the rolling planimeter, there are provided two broad rollers upon which the instrument moves, from one of which rollers the movement is imparted to the recording mechanism. The measuring wheel revolves by contact with a polished sphere segment, and only the rollers and the tracer are in contact with the drawing, so that the results are not affected by irregularity of the paper. Accordingly, it will measure with one operation the area of a figure of any length, the width of which does not exceed the length of the extended tracer arm.

From the above description, it will be seen that both types of instruments are quite complicated in construction, and embrace a multiplicity of moving parts.

In contradistinction to these relatively complicated devices, the present invention provides a device which is extremely simple both in its production and use, which eliminates all relatively moving parts, but which, however, will give accurate measurements of the area of any plane figure, and which will enable the value of this area to be read directly from the device.

Another object of the invention is to provide an area-measuring device which may be produced, and reproduced, on various scales, by practically a single photographic process.

A still further object of the invention is to provide an area-measuring device which, when applied to a plane figure, such as a map, for example, reads directly in acres, for example, the area represented by a predetermined portion of the said map.

A still further object of the invention is to provide a process for producing the said device which process is easily carried out in a very simple and economical manner.

Further objects and advantages of the present invention will become apparent as the description proceeds and the features of novelty will be pointed out in particularity in the appended claims; and the invention accordingly comprises the features of construction, combination of elements, and arrangement of parts which will be exemplified in the construction hereinafter set forth and the scope of the application of which will be indicated in the claims.

The present application is a division of the co-pending application Serial No. 742,711, filed Sept. 5, 1934, entitled Measuring devices.

The present invention will be understood more readily by reference to the accompanying drawing, which shows an illustrative embodiment of one form of construction embracing the principles of the present invention.

Figure 2:
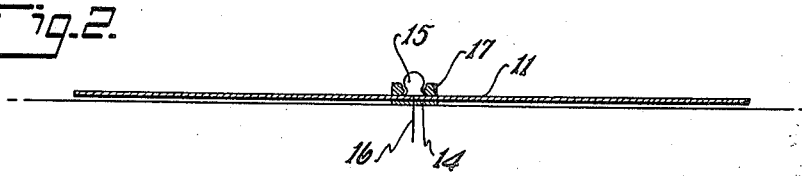

In the drawing,

Fig. 1 is a plan view of a device embodying one form of the invention, the said device being illustrated as being superposed upon an area to be measured; and Fig. 2 is a sectional elevation of the device illustrated in Fig. 1 and shown with supporting and handle means for facilitating the operation of the device.

Referring more particularly to the drawing, the numeral 10 represents an area to be measured. This area may be in a map 10', or photograph, or any other similar device. The numeral 11 represents a sheet of transparent and preferably flexible material having concentric circles 12 marked thereon. The radii of the circles are such as to give the successive spaces or annuli between the circles areas which differ by a constant amount. For example, if the first or innermost circle encompasses an area of one square inch, the second circle encloses an area of two square inches, and the third an area of three square inches. The space or annulus between the first and second circle, and the annulus between the second and third circle have each an area of one square inch. The sheet 11 with the circles thereon may be used as a planimeter. In order to measure the area 10, the center of the circles 12 may be placed anywhere. In general, the more circles which the periphery of the area 10 cuts, the more accurate will be the determination of the numerical value of the area 10. The center of the circles may be held in position by any convenient means such as a pin pressed through a small hole 13 at the center. The sheet 11 is then rotated about the center so that the point a on the smallest circle which cuts the area moves from its position directly above the periphery of the area on one side to a point a' where it will be in registry with the periphery of the area on the opposite side. To accomplish this motion of the sheet 11, a sharp pointed instrument may be applied against the sheet 11 at the point a and used as a pushing element to push the point a to the point a'. Thereafter, the instrument may be placed at the point b and the sheet rotated until the point b reaches the point b'. The point a, by this latter motion, will be moved completely away from the area 10. The same procedure is followed with each of the circles which intersects the area to be measured.

Certain indicia may be provided around the periphery of the outermost circle. As shown, the outermost circle is divided into 10 successive equal arcs and the numbers 1 to 10 are provided respectively adjacent to the successive ends of the said arcs. Before the sheet is first rotated the zero point of the indicia will be in registry with some point A on the map which contains the area. After the rotation of the transparent sheet has been completed, the point A will be adjacent to some point of the indicia such as the point 2. This means that the sheet 11 has been turned through $\frac{2}{10}$ of a complete circle, and that the area being measured is equal to $\frac{2}{10}$ of the area included in any one annulus. If the inner circle is equal to one square inch, the area being measured is thus found to be equal to $\frac{2}{10}$ of one square inch.

In the rotation of the sheet 11 it is immaterial which circle is moved first from one side to the other of the area to be measured. It is only necessary that before the operation is completed all of the circles cutting the area shall have been moved from one side of the area to the other in the same direction.

Depending upon what the area of any annulus is and upon what the scale of the map is, the indicia may be determined arithmetically, so that the reading will be directly in terms of actual area which the map represents, for example, in acres or square miles.

In the manufacture of the present device any suitable surface may be employed, and a series of concentric circles is drawn thereon. The smallest of these circles has a unit area, and the remaining circles are drawn using radii of such length computed so that the area of the space or annulus between each successive circle will be equal to the area of the smallest circle. There is no limitation as to the number of these circles, and the greater their number the more accurate will be the results. The circumference of the outermost circle is then divided into a convenient number of successive equal arcs, which conveniently are indicated by successive numerical indicia, which are applied conveniently in a clockwise direction starting from any convenient zero point; and the successive arcs between the said indicia may be subdivided into any number of equal subdivisions to produce greater accuracy in reading. Thus, if the circumference be divided into 10 equal arcs, for example, each of these arcs represents $\frac{1}{10}$ of the unit area of the smallest circle; and if each of these arcs be subdivided further into tenths readings down to hundredths of the unit area of the smallest circle can be read directly and with accuracy.

Of course, it will be understood that these numerical indicia may be omitted if desired, but their application is convenient as will be obvious; also, it will be apparent that, if desired, the numerical indicia may be applied in counter-clockwise direction, starting from the zero point, as well as in the clockwise direction illustrated in the drawing. It will be seen also that the values of these indicia vary directly as the angular distance from a predetermined line through the center of the annuli between the circles.

Having thus prepared the original surface it may be photographed on a photo-sensitive film of transparent and flexible material, such as a cellulose acetate film having a sensitized surface, so that the original surface with its circles may be photographed directly and permanently on the film, which when developed may be used directly as a planimeter, or it may be used as a negative from which other planimeters may be printed. If further indicia are desired, they may be applied, and since the photograph is permanent and indelible, the finished negatives or prints may be washed off as desired with any non-solvent liquid.

If it is desired to have a planimeter of larger dimensions, a photograph may be taken of the originally prepared sheet so as to give an enlarged negative when the film is developed, from which enlarged negative correspondingly enlarged positives may be printed. In such instance, therefore, when a plurality of different sized planimeters are to be produced, the method comprises marking off upon a surface a plurality of concentric juxtaposed annuli of equal areas, as above described, and photographing the thus-prepared surface upon a plurality of transparent materials, forming the photographic film, so that the annular areas on one of the transparent materials are equal to each other, and the annular areas on a second of the transparent materials are equal to each other, but in such a manner that the areas on the first transparent material or film are unequal to the areas on the second transparent material.

It is to be seen, therefore, that the present invention provides a single substantially-flat flexible sheet adapted to be used as a planimeter, having no relatively-moving parts and no parts to get out of order. Its simplicity makes for large-scale production and for reproduction in varying dimensions.

Friction between the planimeter and the map over which it is rotated may be reduced. Thus, in the modification shown in Fig. 2, this is accomplished by the element 14 which is fixed to the under side of the element 11 at the center of the circles 12. By means of element 14, a portion of the sheet 11 is held out of frictional contact with the underlying map. Handle means may be provided, such as the knob 15. Means for anchoring the device to a map, such as for example the pin 16 may be fixed to the knob 15 and may extend through the hole 13 in the sheet 11 and through an opening in the element 14 in registry therewith. The knob 15 may be held in position by an element 17 which is fixed to sheet 11 and which forms a collar about a restricted part of the knob. The sheet 11 and elements 14 and 17 therefore are rotatable about the knob 15. The elements 14 and 17 are preferably transparent and may be of the same material as the sheet 11, for example, glass or a cellulose composition.

It will be understood that the invention is not limited necessarily, to the specific details of the construction as are herein specifically illustrated and described, but it will be apparent that such details are subject to various modifications which will become apparent readily to one skilled in the art, without departing from the spirit of the invention; and it will be understood, therefore, that it is intended and desired to include within the scope of the invention such modifications and changes as may be necessary to adapt it to varying conditions and uses. It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent, is:

1. The method of making a planimeter, which comprises drawing on a suitable sheet of sufficient thickness to prevent deformation of the sheet during use as a planimeter, a series of concentric circles while proportioning the length of the radius of each successive circle so that the innermost circle of the series will have a unit area of surface and the area of each space between successive circles of the series will be equal to the area of the innermost circle, and dividing the circumference of the outermost circle into a plurality of equal successive arcs.

2. The method of making a planimeter, which comprises drawing on a suitable sheet a series of concentric circles while proportioning the length of the radius of each successive circle so that the innermost circle of the series will have a unit area of surface and the area of each space between successive circles of the series will be equal to the area of the innermost circle, dividing the circumference of the outermost circle into a plurality of equal successive arcs, and photographing the resulting surface upon a transparent sheet of sufficient thickness to prevent deformation of the sheet during use as a planimeter.

3. The method of making a planimeter, which comprises marking off upon a surface a plurality of concentric juxtaposed annuli of equal areas, and photographing the said surface upon a transparent material of sufficient thickness to prevent deformation of the material during use as a planimeter.

4. The method of making a planimeter, which comprises marking off upon a surface a plurality of concentric juxtaposed annuli of equal areas photographing the said surface upon a transparent material of sufficient thickness to prevent deformation of the material during use as a planimeter, and marking numerical indicia angularly upon the center of the said annuli upon the said material, the values of the said indicia varying directly as the angular distance from a predetermined line through the said center.

5. The method of making a planimeter, which comprises marking off upon a surface a plurality of concentric juxtaposed annuli of equal areas marking numerical indicia angularly about the center of the said annuli and upon the said surface, and photographing said surface upon a transparent material of sufficient thickness to prevent deformation of the material during use as a planimeter.

HALE G. SMITH.